J. D. MADDOX.
BRACE CLAMP.
APPLICATION FILED AUG. 23, 1909.
959,147.
Patented May 24, 1910.
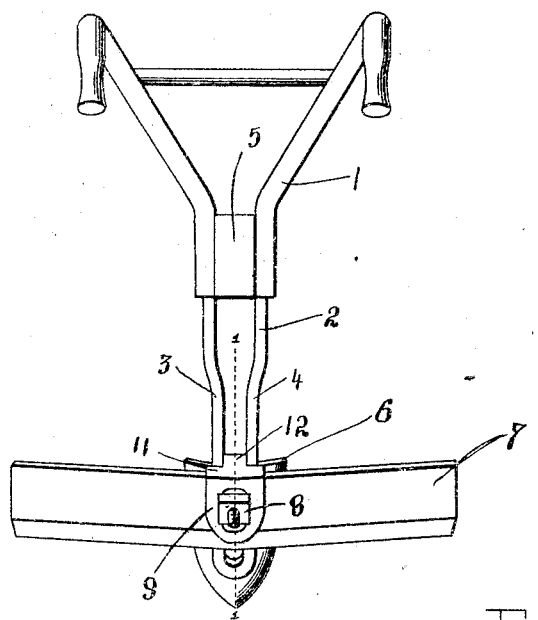
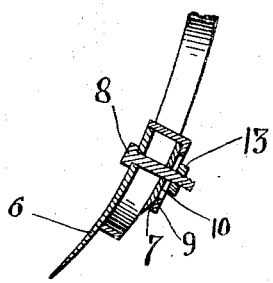
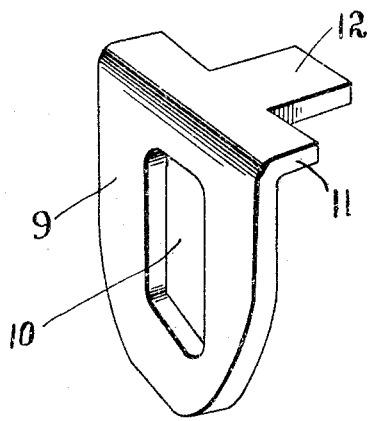
Witnesses
Alan F. Garner
Henry T. Bright
Inventor
John D. Maddox
By Chandler & Chandler
Attorneys

UNITED STATES PATENT OFFICE.

JOHN D. MADDOX, OF CULVERTON, GEORGIA.

BRACE-CLAMP.

959,147.      Specification of Letters Patent.      Patented May 24, 1910.

Application filed August 23, 1909. Serial No. 514,273.

*To all whom it may concern:*

Be it known that I, JOHN D. MADDOX, a citizen of the United States, residing at Culverton, in the county of Hancock, State of Georgia, have invented certain new and useful Improvements in Brace-Clamps; and I do hereby declare the following to be a full, clear, and exact description of the invention, such as will enable others skilled in the art to which it appertains to make and use the same.

This invention relates to improvements in brace clamps for plows and is more particularly adapted for use with plows having a single foot or standard to which various forms of cultivator blades may be attached by what is commonly called a heel bolt, although the invention is not limited in its application to any type of plow being equally serviceable in connection with plows of different kinds.

The object of the invention is to provide simple, efficient and inexpensive means for holding a shovel plow or any other form of plow blade and a cultivator blade against turning on the foot or standard without imposing on the heel bolt any further strain than is required to maintain the parts firmly in engagement, and to this end the invention consists in the construction hereinafter set forth and illustrated in the accompanying drawings, in which—

Figure 1 is a rear elevation of a plow embodying the invention; Fig. 2, a section on the line 1—1 of Fig. 1; and, Fig. 3, a perspective view of a clamp for securing the plow blade and cultivator blade to the standard.

Referring to the drawings, 1 indicates a plow of ordinary form provided with a foot or standard 2. This standard may be of any suitable construction, but as shown and preferred, it consists of a single strip or bar of metal doubled upon itself to form a looped lower end and parallel separated side arms 3 and 4, which are secured at their upper ends to the opposite sides of the beam 5.

The plow is provided with two blades, one of which is a shovel blade 6 and the other a cultivator blade 7, secured respectively to the front and rear portions of the standard 2 by a heel bolt 8 passing through openings in the shovel blade 6 and the cultivator blade 7 and between the side arms 3 and 4 of the standard.

To maintain the blades in proper relation and hold them against turning upon the standard 2 there is provided a clamp plate formed with a main body portion 9, having a central longitudinal slot 10 therein. The upper end of the clamp is bent at right angles to the body portion 9 to form the extension 11, and a tongue 12 projects centrally therefrom and lies in the same plane therewith.

In applying the clamp just described to secure the cultivator blade 7 and shovel blade 6 to the standard 2, said shovel blade is placed on the forward side of the standard and the cultivator blade on the rear thereof. The clamp is then placed against the rear face of the cultivator blade with its bent angular portion 11 overlying the top of the cultivator blade and the tongue 12 extending between the side bars 3 and 4 and overlying the top of the shovel blade. The bolt 8 is then passed through the blade 6 between the side bars 3 and 4 of the standard, through the cultivator blade 7 and through the slot 10 in the clamp. The nut 13 is then screwed on the threaded end of said bolt and the shovel blade, cultivator blade and clamp drawn together to the desired extent. It will thus be obvious that owing to the fact that the clamp cannot turn on the bolt 8 by reason of the sides of the tongue 12 abutting the side bars 3 and 4 of the standard, and it will also be equally obvious that the shovel blade 11 and the cultivator blade 7 cannot turn on the bolt 8 by reason of the engagement of their top edges with the tongue 12, and the angular portion 11 respectively.

The term "cultivator blade" as used herein is intended to include all the various forms of plow points and blades to which the invention is applicable.

What is claimed is:—

In combination with a U-shaped cultivator standard, a plow shovel on the front side and bearing against the front edges of the arms or sides thereof, a cultivator sweep bearing against the rear edges of the arms or sides thereof and opposite the said shovel, a plate bearing on the rear side of said sweep and having a vertical slot, said plate being further provided at its upper end with a forwardly extending flange lying on the upper edge of the sweep and also with a forwardly extending tongue, projecting medially from said flange, extending between sides or arms of the standard and bearing on the upper edge of the shovel, and a bolt extending through the shovel, the space between the arms or sides of the standard, the sweep and also through the said slot of the said plate, a nut on said bolt bearing against the rear side of the plate and co-acting with the bolt to clamp the shovel, the standard, the sweep and plate together.

In testimony whereof, I affix my signature, in presence of two witnesses.

JOHN D. MADDOX.

Witnesses:
J. A. DILLARD,
J. D. BURNETT.